United States Patent
Aono et al.

(10) Patent No.: US 11,149,805 B2
(45) Date of Patent: Oct. 19, 2021

(54) CENTRIFUGAL CLUTCH

(71) Applicant: Kabushiki Kaisha F.C.C., Hamamatsu (JP)

(72) Inventors: Kaoru Aono, Shizuoka (JP); Yuta Yokomichi, Shizuoka (JP); Yuta Kine, Shizuoka (JP); Makoto Kataoka, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 17/047,938

(22) PCT Filed: May 8, 2019

(86) PCT No.: PCT/JP2019/018431
§ 371 (c)(1),
(2) Date: Oct. 15, 2020

(87) PCT Pub. No.: WO2019/216351
PCT Pub. Date: Nov. 14, 2019

(65) Prior Publication Data
US 2021/0108687 A1 Apr. 15, 2021

(30) Foreign Application Priority Data

May 11, 2018 (JP) .............................. JP2018-091930

(51) Int. Cl.
*F16D 43/14* (2006.01)
*F16D 43/21* (2006.01)
*F16H 9/18* (2006.01)

(52) U.S. Cl.
CPC ............ *F16D 43/211* (2013.01); *F16D 43/14* (2013.01); *F16D 2043/145* (2013.01); *F16H 9/18* (2013.01)

(58) Field of Classification Search
CPC ........................... F16D 43/14; F16D 2043/145
See application file for complete search history.

(56) References Cited

U.S. PATENT DOCUMENTS 4,380,280 A * 4/1983 Walters ................... F16D 13/14
192/111.16
6,000,519 A 12/1999 Becker et al.
(Continued)

FOREIGN PATENT DOCUMENTS

JP 59-94624 U 6/1984
JP 10-331874 A 12/1998
(Continued)

OTHER PUBLICATIONS

International Search Report (ISR) dated Jul. 2, 2019 filed in PCT/JP2019/018431.

*Primary Examiner* — Huan Le
(74) *Attorney, Agent, or Firm* — Rankin, Hill & Clark LLP

(57) ABSTRACT

A centrifugal clutch is configured so that assist thrust can be maintained constant or can be decreased even when a clutch shoe is abraded. The centrifugal clutch includes a drive plate to be rotatably driven by drive force of an engine. The drive plate includes each of swing support pins and the plate-side cam bodies. The swing support pin is fitted in a long-hole-shaped pin slide hole formed at a clutch weight to swingably support the clutch weight. The plate-side cam body includes a cylindrical roller, and a weight-side cam body of the clutch weight contacts the plate-side cam body. The weight-side cam body is formed as such a curved surface that a cam angle when a clutch shoe contacts a cylindrical surface of a clutch outer is the same between before and after abrasion of the clutch shoe progresses.

12 Claims, 8 Drawing Sheets

(56) References Cited

U.S. PATENT DOCUMENTS

| | | | |
|---|---|---|---|
| 2005/0178637 A1* | 8/2005 | Tsuchiya | F16D 43/18 192/105 CD |
| 2008/0060903 A1* | 3/2008 | Lian | F16D 43/18 192/105 CD |
| 2013/0334005 A1* | 12/2013 | Wu | F16D 43/14 192/103 B |
| 2019/0072140 A1 | 3/2019 | Aono et al. | |
| 2019/0186558 A1 | 6/2019 | Yokomichi et al. | |

FOREIGN PATENT DOCUMENTS

| | | |
|---|---|---|
| JP | 2017-72211 A | 4/2017 |
| JP | 2018-9675 A | 1/2018 |

\* cited by examiner

CENTRIFUGAL CLUTCH

TECHNICAL FIELD

The present invention relates to a centrifugal clutch configured to block transmission of rotary drive force to a driven side until an engine reaches a predetermined number of rotations and transmit the rotary drive force to the driven side when the engine reaches the predetermined number of rotations.

BACKGROUND ART

Typically, in, e.g., a motorcycle or a string trimmer, a centrifugal clutch configured to transmit rotary drive force to a driven side when an engine reaches a predetermined number of rotations has been used. For example, a centrifugal clutch disclosed in Patent Literature 1 below includes a drive plate to be rotatably driven by rotary drive force from an engine and a clutch weight. The clutch weight is rotatably supported on the drive plate, and by rotary drive of the drive plate, is opened outwardly in a radial direction and is pressed against a clutch outer. In this case, the centrifugal clutch includes, between the drive plate and the clutch weight, each of a protruding body and a driven portion forming a pair of cams. The centrifugal clutch is configured so that the clutch weight can be quickly and firmly pressed against the clutch outer by the pair of cams.

CITATION LIST

Patent Literature

PATENT LITERATURE 1: JP-A-2018-9675

However, in the centrifugal clutch described in Patent Literature 1 above, a cam angle decreases as abrasion of a clutch shoe provided at the clutch weight and pressed against the clutch outer progresses. For this reason, there has been a problem that a drive operation feeling is changed due to an increase in the assist thrust of pressing the clutch outer by the clutch weight and abrasion of a friction member such as the clutch shoe is accelerated.

The cam angle described herein is an angle between a normal line to a line passing through a sliding portion at which the protruding body and the driven portion contact each other and the rotary drive center of the drive plate and a sliding direction line at the sliding portion. In this case, in a case where the sliding portion is in surface contact, the center position of the length of the sliding portion in a sliding direction is employed. In a case where at least one of the protruding body or the driven portion has a curved surface, the sliding direction line is a tangential line to the curved surface at the sliding portion. The inventor(s) of the present invention has found that the assist thrust decreases as the cam angle increases and the assist thrust increases as the cam angle decreases.

In the centrifugal clutch described in Patent Literature 1 above, the protruding body includes a roller, and the drive portion includes a linearly-extending flat surface. The inventor(s) of the present invention has found that in the centrifugal clutch described in Patent Literature 1 above, the cam angle decreases and the assist thrust of pressing the clutch outer by the clutch weight increases as abrasion of the clutch shoe progresses.

The present invention has been made for coping with the above-described problems, and an object of the present invention is to provide a centrifugal clutch configured so that assist thrust can be maintained constant or can be decreased even when a clutch shoe is abraded.

SUMMARY OF INVENTION

In order to achieve the object, a feature of the present invention is a centrifugal clutch which includes: a drive plate to be rotatably driven together with a driven pulley in response to drive force of an engine; a clutch outer having, outside the drive plate, a cylindrical surface provided concentrically with the drive plate; a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole and the other end side displacing toward a cylindrical surface side of the clutch outer; a plate-side cam body having, on the drive plate, a surface extending in a rotary drive axis direction of the drive plate; and a weight-side cam body provided at the clutch weight and configured to slide and climb on the plate-side cam body upon displacement of the other end side of the clutch weight. The swing support pin is provided at one of the drive plate or the clutch weight, and is formed to extend toward the other one of the drive plate or the clutch weight, the pin slide hole is provided at the other one of the drive plate or the clutch weight and is formed in a long hole shape allowing backward displacement of the one end side of the clutch weight in the rotary drive direction of the drive plate, and the swing support pin is slidably displaceably fitted in the pin slide hole, and at the plate-side cam body and the weight-side cam body, at least one of sliding surfaces has a curved surface, and the at least one of the sliding surfaces is, assuming a cam angle as an angle between a normal line to a line passing through a sliding portion at which the plate-side cam body and the weight-side cam body contact each other and a rotary drive center of the drive plate and a tangential line to the curved surface at the sliding portion, formed as such a curved surface that the cam angle when the clutch shoe contacts the cylindrical surface of the clutch outer is identical between before and after abrasion of the clutch shoe progresses or the cam angle after the abrasion has progressed is greater.

According to the feature of the present invention configured as described above, in the centrifugal clutch, at least one of the sliding surfaces of the plate-side cam body provided at the drive plate and the weight-side cam body provided at the clutch weight includes the curved surface. Further, this sliding surface is formed as such a curved surface that the cam angle when the clutch shoe contacts the cylindrical surface of the clutch outer is the same between before and after abrasion of the clutch shoe progresses or increases as abrasion of the clutch shoe progresses. With this configuration, in the centrifugal clutch according to the present invention, even when the clutch shoe is abraded, assist thrust is maintained constant, and therefore, a drive operation feeling can be constant. Further, an increase in the assist thrust is suppressed, and therefore, abrasion and damage of a friction portion can be reduced while an increase in a surface pressure between the plate-side cam body and the weight-side cam body and a surface pressure between the clutch shoe and the clutch outer is suppressed.

Note that the long hole in the above-described aspect of the invention is a through-hole or a blind hole extending long and thin as a whole, and a length in one direction is longer than a width direction perpendicular to the one direction.

Further, another feature of the present invention is the centrifugal clutch in which, at the plate-side cam body and the weight-side cam body, the at least one of the sliding surfaces is formed as such a curved surface that the cam angle when the clutch shoe contacts the cylindrical surface of the clutch outer is identical between before and after the abrasion of the clutch shoe progresses.

According to another feature of the present invention configured as described above, in the centrifugal clutch, at least one of the sliding surfaces of the plate-side cam body and the weight-side cam body is formed as such a curved surface that the cam angle when the clutch shoe contacts the cylindrical surface of the clutch outer is the same between before and after the abrasion of the clutch shoe progresses. Thus, even when the clutch shoe is abraded, the assist thrust is maintained constant, and therefore, the drive operation feeling can be constant. Further, acceleration of abrasion of friction members such as the plate-side cam body, the weight-side cam body, the clutch shoe, and the clutch outer can be suppressed.

Furthermore, another feature of the present invention is the centrifugal clutch in which the plate-side cam body is configured such that the sliding surface has a raised curved surface, and the weight-side cam body is configured such that the sliding surface has a recessed or raised curved surface sliding on the raised curved surface.

According to still another feature of the present invention configured as described above, in the centrifugal clutch, the sliding surface of the plate-side cam body has the raised curved surface. Further, the sliding surface of the weight-side cam body has the recessed or raised curved surface sliding on the raised curved surface. In addition, both sliding surfaces include the curved surfaces. Thus, as compared to a case where one of the plate-side cam body or the weight-side cam body is formed in a linearly-extending flat shape, the plate-side cam body and the weight-side cam body can be physically configured small, and therefore, the centrifugal clutch can be compactified.

Moreover, still another feature of the present invention is the centrifugal clutch in which the plate-side cam body includes a roller supported rotatably on the drive plate, and the weight-side cam body is configured such that the sliding surface has a curved surface sliding on the roller.

According to still another feature of the present invention configured as described above, in the centrifugal clutch, the plate-side cam body includes the roller supported rotatably on the drive plate. Further, the sliding surface of the weight-side cam body has the curved surface sliding on the roller. Thus, the plate-side cam body and the weight-side cam body can be configured physically small and simply.

Further, still another feature of the present invention is the centrifugal clutch which further includes a pivot-point-side slide member provided between the swing support pin and the pin slide hole to slide the swing support pin and the pin slide hole.

According to still another feature of the present invention configured as described above, in the centrifugal clutch, the swing support pin and the pin slide hole slide on each other through the pivot-point-side slide member. Thus, slidability between each of the swing support pin and the pin slide hole and the pivot-point-side slide member is improved, and therefore, the clutch weight can more smoothly turnably displace relative to the clutch outer. Further, abrasion of the swing support pin and the pin slide hole can be prevented. In this case, in the centrifugal clutch, each of the swing support pin and the pin slide hole is made of a metal material, and the pivot-point-side slide member is made of a resin material. Thus, slidability between each of the swing support pin and the pin slide hole and the pivot-point-side slide member can be more improved.

Thermoplastic resin or thermosetting resin having thermal resistance and abrasion resistance can be used as the resin material forming the pivot-point-side slide member, and engineering plastic or super engineering plastic is preferable. Specifically, polyetheretherketone resin (PEEK), polyphenylene sulfide resin (PPS), polyamide-imide resin (PAI), fluorine resin (PTFE), or polyimide resin (PI) can be used as the thermoplastic resin. Diallyphthalate resin (PDAP), epoxy resin (EP), or silicon resin (SI) can be used as the thermosetting resin.

DESCRIPTION OF EMBODIMENTS

Figure 1:
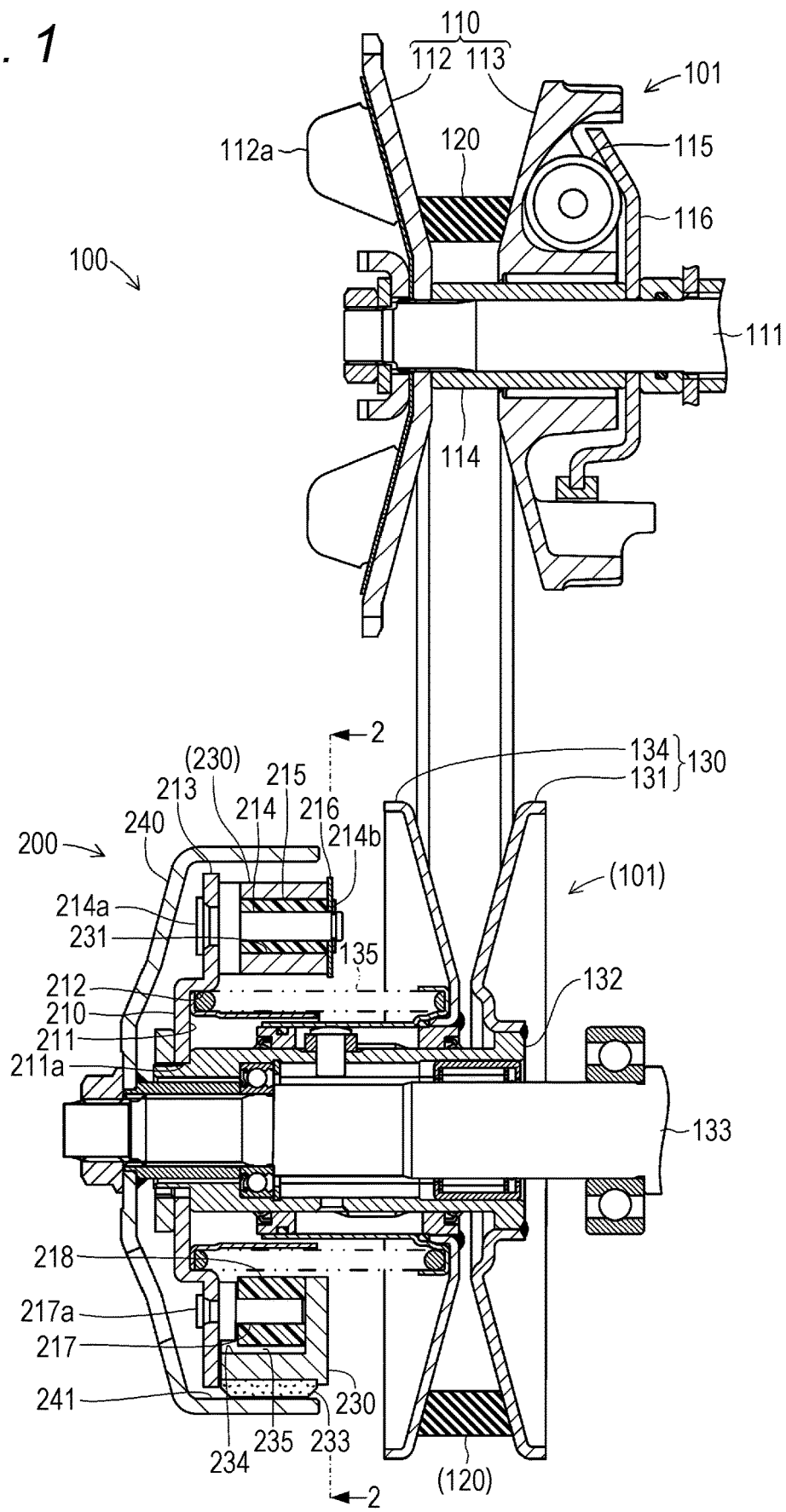
FIG. 1 is a plan sectional view schematically illustrating a configuration of a power transmission mechanism including a centrifugal clutch according to the present invention.
Figure 2:
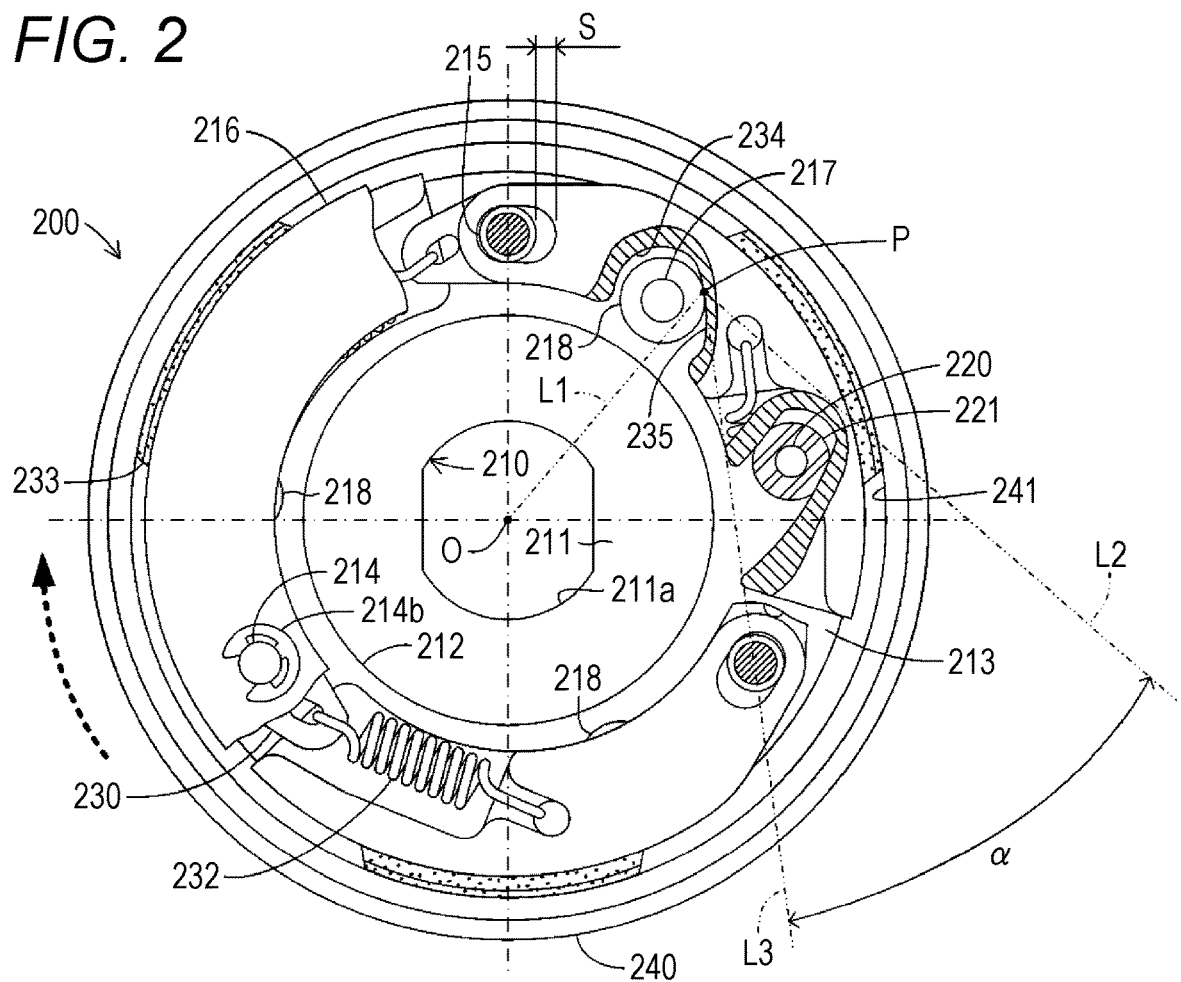
FIG. 2 is a side view of the centrifugal clutch as seen from a 2-2 line illustrated in FIG. 1.

Hereinafter, one embodiment of a centrifugal clutch according to the present invention will be described with reference to the drawings. FIG. 1 is a plan sectional view schematically illustrating a configuration of a power transmission mechanism 100 including a centrifugal clutch 200 according to the present invention. Moreover, FIG. 2 is a side view of the centrifugal clutch 200 as seen from a 2-2 line illustrated in FIG. 1. The power transmission mechanism 100 including the centrifugal clutch 200 is a mechanical device mainly provided between an engine and a rear wheel as a drive wheel in a motorcycle such as a scooter to transmit rotary drive force to the rear wheel or block such transmission while automatically changing a reduction ratio with respect to the number of rotations of the engine.
(Configuration of Centrifugal Clutch 200)

The power transmission mechanism 100 mainly includes each of a transmission 101 and the centrifugal clutch 200. The transmission 101 is a mechanical device configured to reduce speed steplessly to transmit the rotary drive force from the not-shown engine to the centrifugal clutch 200. The transmission 101 mainly includes each of a drive pulley 110, a V-belt 120, and a driven pulley 130. Of these components, the drive pulley 110 is provided on a crankshaft 111 extending from the engine, and is a mechanical device to be directly rotatably driven by the rotary drive force of the engine. The drive pulley 110 mainly includes each of a stationary drive plate 112 and a movable drive plate 113.

The stationary drive plate 112 is a component to be rotatably driven in a state in which the V-belt 120 is sandwiched and held by the stationary drive plate 112 and the movable drive plate 113. The stationary drive plate 112 is formed in such a manner that a metal material is formed into a conical tubular shape. The stationary drive plate 112 is attached onto the crankshaft 111 in a fixed manner in a state in which a raised-side surface of the stationary drive plate 112 faces a movable drive plate 113 side (an engine side). That is, the stationary drive plate 112 is constantly rotatably driven together with the crankshaft 111. Moreover, multiple radiation fins 112a are, on a recessed-side surface of the stationary drive plate 112, provided radially about the axis of the crankshaft 111.

The movable drive plate 113 is a component to be rotatably driven in a state in which the V-belt 120 is sandwiched and held by the movable drive plate 113 and the stationary drive plate 112. The movable drive plate 113 is formed in such a manner that a metal material is formed into a conical tubular shape. The movable drive plate 113 is attached to the crankshaft 111 in a state in which a raised-side surface of the movable drive plate 113 faces the stationary drive plate 112. In this case, the movable drive plate 113 is, through an impregnated bush, attached onto a sleeve bearing 114 fitted onto the crankshaft 111 in a fixed manner. The movable drive plate 113 is attached to the sleeve bearing 114 to freely slide in each of an axial direction and a circumferential direction.

On the other hand, on a recessed-side surface of the movable drive plate 113, multiple roller weights 115 are provided in a state in which the roller weights 115 are pressed by a lamp plate 116. The roller weight 115 is a component configured to displace outward in a radial direction according to an increase in the number of rotations of the movable drive plate 113 to press the movable drive plate 113 to a stationary drive plate 112 side in cooperation with the lamp plate 116. The roller weight 115 is formed in such a manner that a metal material is formed into a tubular shape. Moreover, the lamp plate 116 is a component configured to press the roller weights 115 to the movable drive plate 113 side. The lamp plate 116 is formed in such a manner that a metal plate is bent to the movable drive plate 113 side.

The V-belt 120 is a component configured to transmit rotary drive force of the drive pulley 110 to the driven pulley 130. The V-belt 120 is formed in such an endless ring shape that a core wire is covered with an elastic material such as rubber material. The V-belt 120 is arranged between the stationary drive plate 112 and the movable drive plate 113 and between a stationary driven plate 131 and a movable driven plate 134 of the driven pulley 130, and is bridged between the drive pulley 110 and the driven pulley 130.

The driven pulley 130 is a mechanical device to be rotatably driven by the rotary drive force from the engine, the rotary drive force being transmitted through each of the drive pulley 110 and the V-belt 120. The driven pulley 130 mainly includes each of the stationary driven plate 131 and the movable driven plate 134.

The stationary driven plate 131 is a component to be rotatably driven in a state in which the V-belt 120 is sandwiched and held by the stationary driven plate 131 and the movable driven plate 134. The stationary driven plate 131 is formed in such a manner that a metal material is formed into a conical tubular shape. The stationary driven plate 131 is attached onto a driven sleeve 132 in a fixed manner in a state in which a raised-side surface of the stationary driven plate 131 faces a movable driven plate 134 side.

The driven sleeve 132 is a metal tubular component to be rotatably driven together with the stationary driven plate 131. The driven sleeve 132 is attached to a drive shaft 133 to freely rotate relative to the drive shaft 133 through a bearing. The drive shaft 133 is a metal rotary shaft body configured to drive, through the not-shown transmission, the rear wheel of the motorcycle on which the power transmission mechanism 100 is mounted. In this case, the rear wheel of the motorcycle is attached to one (the right side as viewed in the figure) end portion of the drive shaft 133.

The movable driven plate 134 is a component to be rotatably driven in a state in which the V-belt 120 is sandwiched and held by the movable driven plate 134 and the stationary driven plate 131. The movable driven plate 134 is formed in such a manner that a metal material is formed into a conical tubular shape. The movable driven plate 134 is fitted onto the driven sleeve 132 to freely slide in the axial direction in a state in which a raised-side surface of the movable driven plate 134 faces the stationary driven plate 131.

On the other hand, a torque spring 135 is, on a recessed-side surface of the movable driven plate 134, provided between such a recessed-side surface and a drive plate 210 of the centrifugal clutch 200. The torque spring 135 is a coil spring configured to elastically press the movable driven plate 134 to a stationary driven plate 131 side. That is, the transmission 101 steplessly changes the number of rotations of the engine according to a size relationship between a diameter defined by a clearance between the stationary drive plate 112 and the movable drive plate 113 and provided to sandwich the V-belt 120 and a diameter defined by a clearance between the stationary driven plate 131 and the movable driven plate 134 and provided to sandwich the V-belt 120. Moreover, the centrifugal clutch 200 is provided on each tip end side of the driven sleeve 132 and the drive shaft 133.

The centrifugal clutch 200 is a mechanical device configured to transmit the rotary drive force, which has been transmitted through the transmission 101, of the engine to the drive shaft 133 or block such transmission. The centrifugal clutch 200 mainly includes each of the drive plate 210, three clutch weights 230, and a clutch outer 240.

Figure 3:
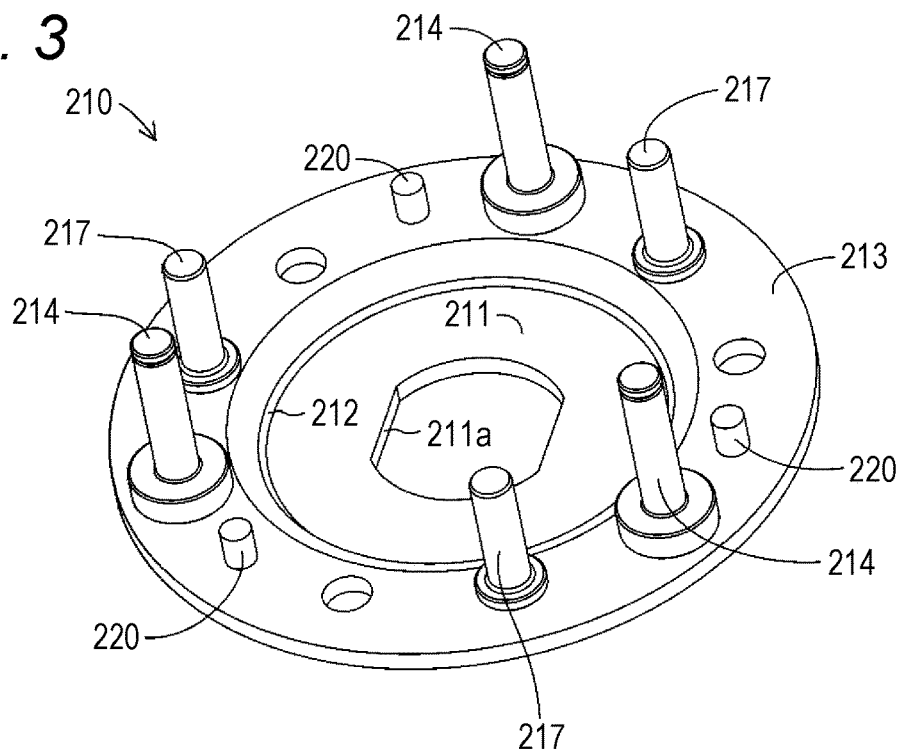
FIG. 3 is a perspective view schematically illustrating an external configuration of a drive plate in the centrifugal clutch illustrated in each of FIGS. 1 and 2.

The drive plate 210 is a component to be rotatably driven together with the driven sleeve 132. The drive plate 210 is formed in such a manner that a metal material is formed into a stepped discoid shape. More specifically, as illustrated in each of FIGS. 3 and 4, the drive plate 210 is formed with a through-hole 211a at a center portion of a flat plate-shaped bottom portion 211 such that the driven sleeve 132 penetrates the through-hole 211a, and is formed with a flange portion 213 at a tip end portion of a tube portion 212 standing at the periphery of the bottom portion 211 such that the flange portion 213 projects in a flange shape. At the flange portion 213, three swing support pins 214, three cam body support pins 217, and three damper receiving pins 220 are provided at equal intervals along the circumferential direction.

The swing support pin 214 is a component configured to turnably support one end side of a clutch weight 230 described later to swing the other end side. The swing support pin 214 is formed as a metal stepped rod. In this case, the swing support pin 214 is attached to the flange portion 213 in a fixed manner by an attachment bolt 214a. The swing support pin 214 provides support in a state in which the swing support pin 214 penetrates a pin slide hole 231 of the clutch weight 230 through a pivot-point-side slide member 215 at an outer peripheral portion of the swing support pins 214 and a state in which the clutch weight 230 is sandwiched through each of an E-ring 214b attached to a tip end portion of the swing support pin 214 and a side plate 216 arranged between the E-ring 214b and the clutch weight 230.

The pivot-point-side slide member 215 is a component arranged between the swing support pin 214 and the pin slide hole 231 to improve slidability therebetween. The pivot-point-side slide member 215 is formed in a cylindrical shape from a resin material. The pivot-point-side slide member 215 is formed to have such inner and outer diameters that the swing support pin 214 and the pin slide hole 231 can rotatably slide relative to each other, i.e., a dimensional tolerance as a clearance fit for each of the swing support pin 214 and the pin slide hole 231.

Moreover, thermoplastic resin or thermosetting resin having thermal resistance and abrasion resistance can be used as the resin material forming the pivot-point-side slide member 215, and engineering plastic or super engineering plastic is preferable. Specifically, polyetheretherketone resin (PEEK), polyphenylene sulfide resin (PPS), polyamide-imide resin (PAI), fluorine resin (PTFE), or polyimide resin (PI) can be used as the thermoplastic resin. Diallyphthalate resin (PDAP), epoxy resin (EP), or silicon resin (SI) can be used as the thermosetting resin. The side plate 216 is a component configured to prevent three clutch weights 230 from detaching from the swing support pins 214. The side plate 216 is formed in such a manner that a metal material is formed into a ring shape.

The cam body support pin 217 is a component configured to rotatably support a plate-side cam body 218. The cam body support pin 217 is formed as a metal stepped rod. With an attachment bolt 217a, the cam body support pin 217 is, in a fixed manner, attached onto the flange portion 213 facing a tip-end-side portion of the clutch weight 230 with respect to the pin slide hole 231.

The plate-side cam body 218 is a component configured to press the clutch weight 230 to a clutch outer 240 side. The plate-side cam body 218 is formed in such a manner that a resin material is formed into a cylindrical shape. In this case, the plate-side cam body 218 is formed to have such an inner diameter that the plate-side cam body 218 can rotatably slide on the cam body support pin 217, i.e., a dimensional tolerance as a so-called clearance fit for the cam body support pin 217. Moreover, the resin material forming the plate-side cam body 218 is similar to the resin material forming the pivot-point-side slide member 215.

The damper receiving pin 220 is a component configured to support a damper 221. The damper receiving pin 220 is formed as a metal rod. The damper 221 is a component configured to guide swing motion for causing the other end side of the clutch weight 230 to approach or separate from the clutch outer 240 and serving as a buffer material upon separation. The damper 221 is formed in such a manner that a rubber material is formed into a cylindrical shape. The damper 221 is fitted onto an outer peripheral surface of the damper receiving pin 220 in a fixed manner.

Figure 4:
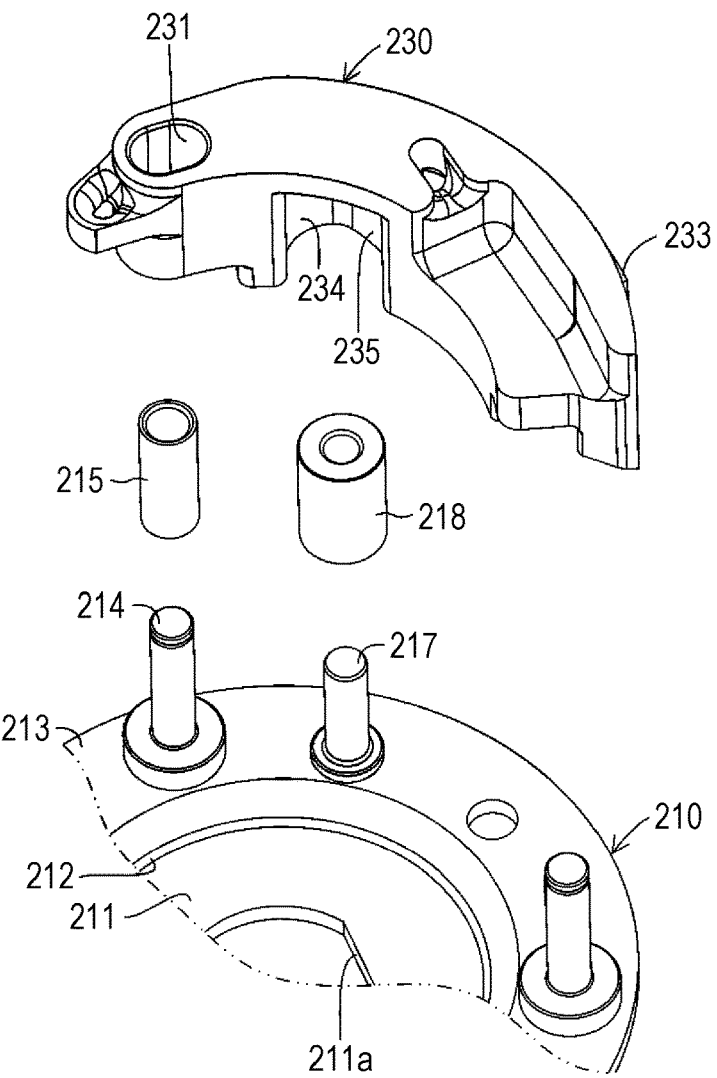
FIG. 4 is a partial exploded perspective view illustrating the state of assembly of the drive plate, a pivot-point-side slide member, a plate-side cam body, and a clutch weight in the centrifugal clutch illustrated in each of FIGS. 1 and 2.
Figure 5:
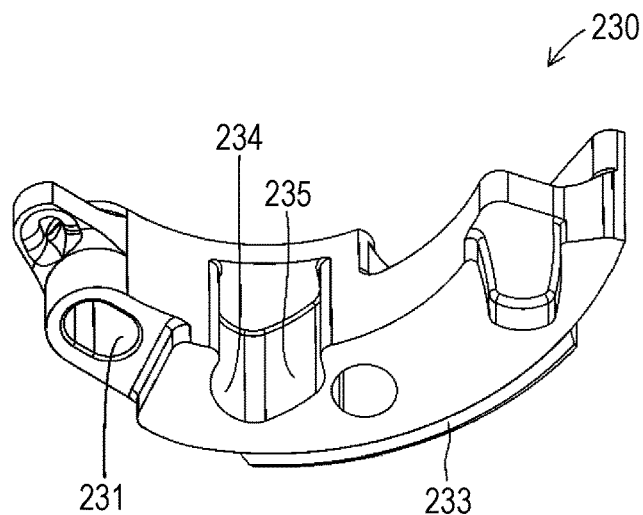
FIG. 5 is a perspective view schematically illustrating, as seen from a drive plate side, an external configuration of the clutch weight in the centrifugal clutch illustrated in each of FIGS. 1 and 2.

As illustrated in each of FIGS. 4 and 5, each of three clutch weights 230 is a component configured to contact or separate from the clutch outer 240 through a clutch shoe 233 according to the number of rotations of the drive plate 210 to transmit the rotary drive force from the engine to the drive shaft 133 or block such transmission. The clutch weight 230 is formed in such a manner that a metal material (e.g., a zinc material) is formed into a curved shape extending along the circumferential direction of the drive plate 210.

In each of these clutch weights 230, the other end side is coupled to adjacent one of the clutch weights 230 by a coupling spring 232 in a state in which one end side is turnably supported by the swing support pin 214 and the pivot-point-side slide member 215 through the pin slide hole 231. The other end side is pulled in an inward direction of the drive plate 210. That is, the clutch weight 230 is supported on the drive plate 210 through each of the swing support pin 214, the pivot-point-side slide member 215, and the pin slide hole 231 in a state in which the other end side provided with the clutch shoe 233 is swingable relative to the clutch outer 240.

Note that for the sake of simplicity in description of a configuration of the clutch weight 230, FIG. 2 illustrates surfaces, which are cut in different thickness directions, of two spots at one of three clutch weights 230. Further, FIG. 2 illustrates, by a dashed arrow, each of rotary drive directions of the drive plate 210 and the clutch outer 240 in the centrifugal clutch 200.

The pin slide hole 231 is a portion in which the swing support pin 214 of the drive plate 210 is turnably and slidably fitted through the pivot-point-side slide member 215. The pin slide hole 231 is formed as a through-hole penetrating the clutch weight 230 in the thickness direction thereof. The pin slide hole 231 is formed in a long hole shape such that one end side of the clutch weight 230 displaces backward in the rotary drive direction of the drive plate 210 when the clutch shoe 233 contacts the clutch outer 240.

In this case, a long hole forming the pin slide hole 231 is formed such that a length in one direction is longer than that in a width direction perpendicular to the one direction and the entirety of the long hole extends long and thin. More specifically, the pin slide hole 231 is formed to have an inner diameter as a clearance fit slightly larger than the outer diameter of the pivot-point-side slide member 215 in the width direction as the radial direction of the drive plate 210. On the other hand, a longitudinal direction of the pin slide hole 231 extends in an arc shape or a linear shape in such a direction that displacement of the clutch weight 230 to a side on which pressing of a weight-side cam body 235 of the clutch weight 230 against the plate-side cam body 218 is increased and climbing is more promoted is allowed.

In the present embodiment, the pin slide hole 231 is formed to extend in an arc shape to the front side in the rotary drive direction of the drive plate 210. In this case, in the present embodiment, two arcs forming the longitudinal direction of the pin slide hole 231 are concentric with the drive plate 210, but are not necessarily concentric.

The clutch shoe 233 is a component configured to increase friction force for an inner peripheral surface of the clutch outer 240. The clutch shoe 233 is formed in such a manner that a friction material is formed into a plate shape extending in an arc shape. The clutch shoe 233 is provided on an outer peripheral surface of each clutch weight 230 on a tip end side opposite to the pin slide hole 231.

Moreover, each of plate-side cam body reliefs 234 in a shape recessed to cover the plate-side cam bodies 218 is formed at a portion of an inner peripheral surface of the clutch weight 230 facing the plate-side cam body 218 of the drive plate 210. The plate-side cam body relief 234 is a portion at which the weight-side cam body 235 configured to climb on the plate-side cam body 218 is formed. The plate-side cam body relief 234 is formed in a groove shape opening at the inner peripheral surface of the clutch weight 230 and extending to a far side, and is formed in such a manner that such a far-side portion is cut out in an arc shape not to contact the plate-side cam body 218.

The weight-side cam body 235 is a portion for displacing the clutch weight 230 to the clutch outer 240 side in cooperation with the plate-side cam body 218. The weight-side cam body 235 includes a smooth curved surface facing the rear side in the rotary drive direction of the drive plate 210. More specifically, the weight-side cam body 235 is formed in an arc shape, and a sliding surface to be pressed against the plate-side cam body 218 extends curved toward an outer rear side in the rotary drive direction of the drive plate 210.

In this case, the sliding surface forming the weight-side cam body 235 is formed as a curved surface with such a curvature that a cam angle α when the clutch shoe 233 contacts a cylindrical surface 241 of the clutch outer 240 is the same between before and after abrasion of the clutch shoe 233 progresses. The cam angle α described herein is an angle between a normal line L2 and a tangential line L3. The normal line L2 is a normal line to a line L1 passing through a contact point P as a portion at which the plate-side cam body 218 and the weight-side cam body 235 slide in contact with each other and the rotary drive center O of the drive plate 210. The tangential line L3 is a tangential line to the curved surface forming the weight-side cam body 235 at the above-described slide portion.

Thus, the sliding surface forming the weight-side cam body 235 is formed as a curved surface with such a curvature that the cam angle α is the same between an initial state in which the clutch shoe 233 is new and there is no or little abrasion and a terminal state in which abrasion of the clutch shoe 233 has progressed and the clutch shoe 233 has approached a use limit. The same cam angle α as described herein means not only the precisely-same angle, but also includes a predetermined acceptable range. According to an experiment conducted by the inventor(s) of the present invention, in a case where the cam angle α in a case where abrasion of the clutch shoe 233 is in the terminal state is within a range of ±5° with respect to the cam angle α in a case where abrasion of the clutch shoe 233 is in the initial state, these angles can be taken as the same angle.

This curved surface forming the weight-side cam body 235 can be defined by various methods. For example, as the curved surface forming the weight-side cam body 235, a curved surface with such a curvature that the cam angle α can be maintained in a case where abrasion of the clutch shoe 233 is in the terminal state and the clutch shoe 233 contacts the cylindrical surface 241 of the clutch outer 240 is formed with reference to the cam angle α in a case where abrasion of the clutch shoe 233 is in the initial state and the clutch shoe 233 contacts the cylindrical surface 241 of the clutch outer 240. Alternatively, as the curved surface forming the weight-side cam body 235, a curved surface with such a curvature that the cam angle α is obtained in a case where abrasion of the clutch shoe 233 is in the initial state and the clutch shoe 233 contacts the cylindrical surface 241 of the clutch outer 240 is formed with reference to the cam angle α in a case where abrasion of the clutch shoe 233 is in the terminal state and the clutch shoe 233 contacts the cylindrical surface 241 of the clutch outer 240, for example.

In the present embodiment, the weight-side cam body 235 is formed as a single arc having a radius of 24 mm such that the cam angle α is maintained at 40°. However, the cam angle α and the curved surface shape defining the weight-side cam body 235 are determined according to the specifications of the centrifugal clutch 200, and needless to say, are not limited to those in the present embodiment.

The clutch outer 240 is a component to be rotatably driven together with the drive shaft 133. The clutch outer 240 is formed in such a manner that a metal material is formed into a cup shape covering the outer peripheral surface of the clutch weight 230 from the drive plate 210. That is, the clutch outer 240 has a cylindrical surface 241 configured to friction-contact the clutch shoe 233 of the clutch weight 230 displaced to an outer peripheral side of the drive plate 210.

(Operation of Centrifugal Clutch 200)

Figure 6:
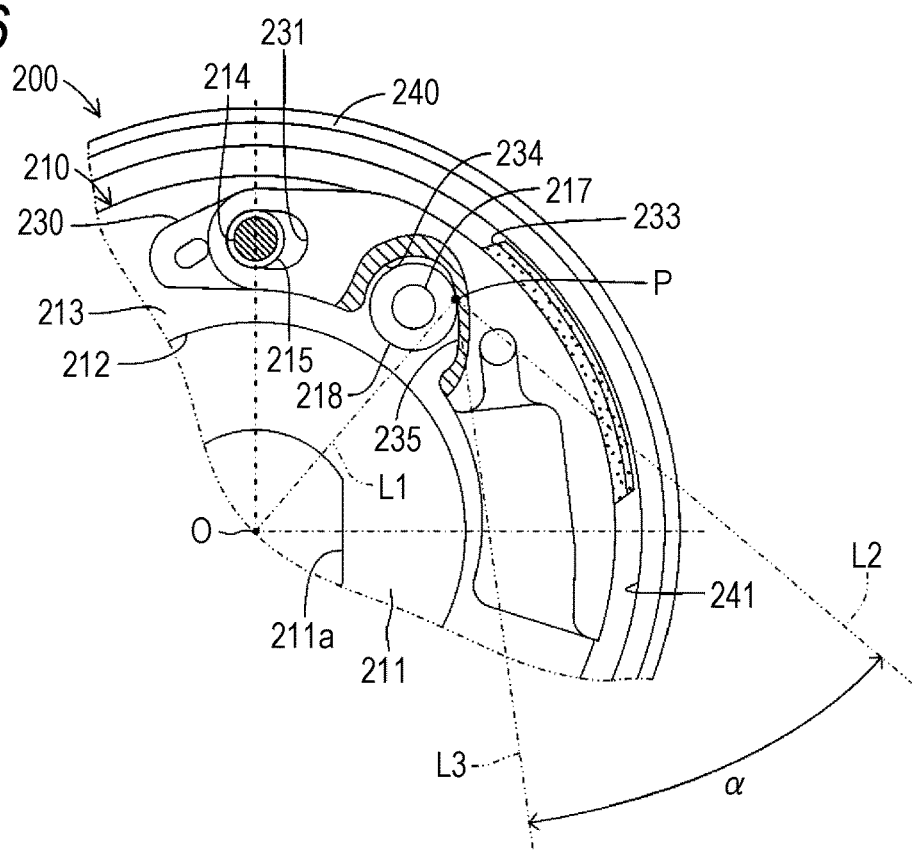
FIG. 6 is a partially-enlarged view illustrating a disconnection state in which a clutch shoe does not contact a clutch outer in the centrifugal clutch illustrated in FIG. 2.
Figure 7:
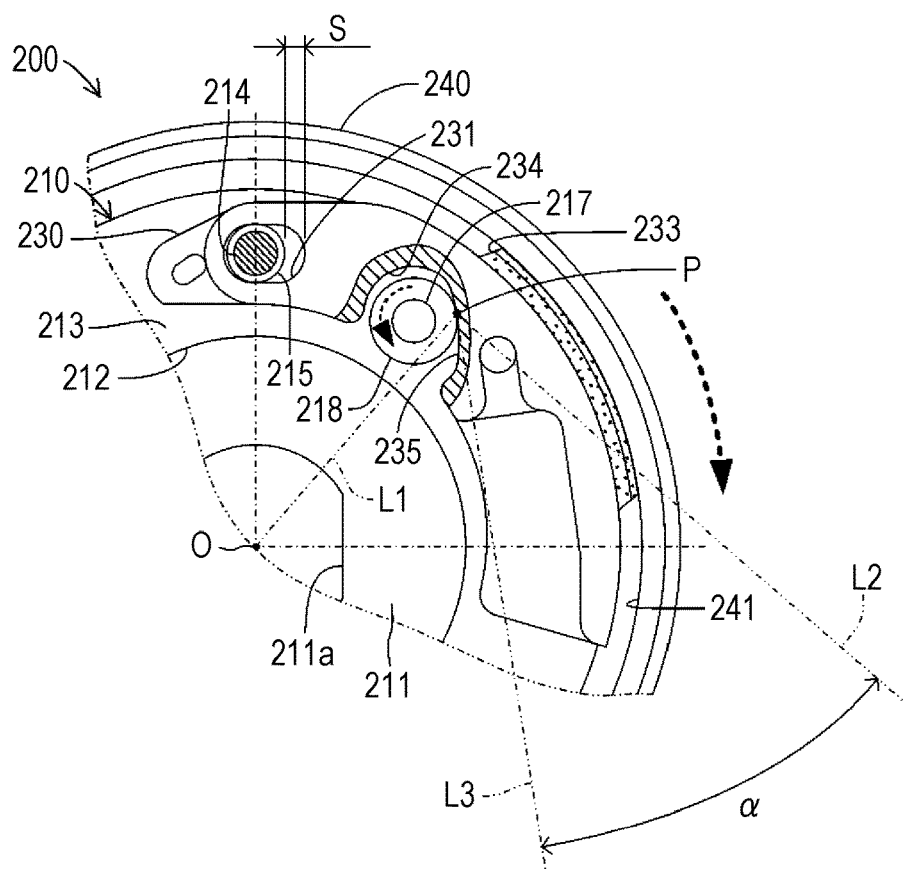
FIG. 7 is a partially-enlarged view illustrating a coupling state in which the clutch shoe is pressed against the clutch outer in an initial state in which there is no or little abrasion of the clutch shoe in the centrifugal clutch illustrated in FIG. 6.
Figure 8:
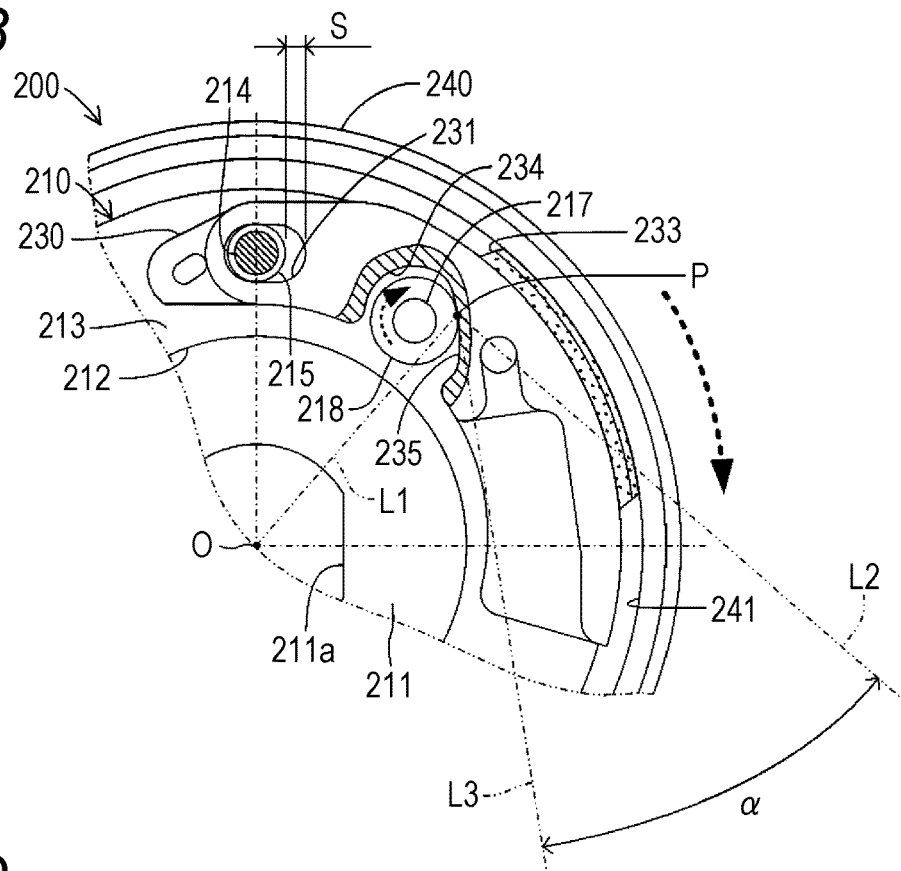
FIG. 8 is a partially-enlarged view illustrating a state right before the clutch weight tilts inwardly in a radial direction of the drive plate in the centrifugal clutch illustrated in FIG. 7.

Next, operation of the centrifugal clutch 200 configured as described above will be described with reference to FIGS. 6 to 9. Note that in FIGS. 6 to 9, the E-ring 214b, the side plate 216, and the coupling spring 232 are not shown. Moreover, in FIGS. 7 to 9, the rotary drive directions of the drive plate 210 and the clutch outer 240 in the centrifugal clutch 200 are each indicated by dashed arrows. Further, in FIGS. 7 to 10, a rotation direction of the plate-side cam body 218 is indicated by a dashed arrow. In addition, FIGS. 6 to 8 illustrate an operation state of the centrifugal clutch 200 in the initial state in which there is no or little abrasion of the clutch shoe 233.

The centrifugal clutch 200 functions as part of the power transmission mechanism 100 arranged between the engine and the rear wheel as the drive wheel in the motorcycle (e.g., the scooter). First, in a case where the engine is in an idling state, the centrifugal clutch 200 blocks transmission of the drive force between the engine and the drive shaft 133 as illustrated in FIG. 6. Specifically, in the centrifugal clutch 200, the drive plate 210 is rotatably driven and the clutch weight 230 is rotatably driven by the rotary drive force of the engine transmitted through the transmission 101.

However, in this case, in the centrifugal clutch 200, centrifugal force acting on the clutch weight 230 is smaller than elastic force (pull force) of the coupling spring 232. Thus, the clutch shoes 233 do not contact the cylindrical surface 241 of the clutch outer 240, and therefore, the rotary drive force of the engine is not transmitted to the drive shaft 133. Moreover, in this case, the weight-side cam body 235 maintains a state in which the weight-side cam body 235 is pressed to contact a roller surface of the plate-side cam body 218 by the elastic force (the pull force) of the coupling spring 232.

Then, the clutch weight 230 is pulled by the pull force of one of two coupled coupling springs 232 that pulls from a position far from the swing support pin 214 (the coupling spring 232 hooked at a position adjacent to the weight-side cam body 235). In this case, the pin slide hole 231 is formed in the long hole shape, and therefore, the clutch weight 230 displaces to the side of the coupling spring 232 hooked at the position adjacent to the weight-side cam body 235. With this configuration, the swing support pin 214 is positioned at a rear end portion of the pin slide hole 231 in the rotary drive direction of the drive plate 210 (see FIG. 6).

On the other hand, the centrifugal clutch 200 transmits the rotary drive force of the engine to the drive shaft 133 according to an increase in the number of rotations of the engine by driver's accelerator operation in the motorcycle. Specifically, in the centrifugal clutch 200, the centrifugal force acting on the clutch weight 230 becomes greater than the elastic force (the pull force) of the coupling spring 232 as the number of rotations of the engine increases. Thus, the clutch weight 230 turnably displaces outward in the radial direction about the swing support pin 214.

That is, in the centrifugal clutch 200, the clutch weight 230 turnably displaces to a cylindrical surface 241 side of the clutch outer 240 against the elastic force (the pull force) of the coupling spring 232 as the number of rotations of the engine increases. As a result, the clutch shoe 233 contacts the cylindrical surface 241. In this case, the swing support pin 214 and the pin slide hole 231 slide on each other through the resin pivot-point-side slide member 215, and therefore, the clutch weight 230 can smoothly turnably displace.

In a case where the clutch shoe 233 contacts the cylindrical surface 241, the clutch weight 230 receives reactive force in the opposite direction of the rotary drive direction through the clutch shoe 233. In this case, the pin slide hole 231 is formed in the long hole shape along the circumferential direction of the drive plate 210, and the swing support pin 214 is positioned at the rear end portion of the pin slide hole 231 in the rotary drive direction of the drive plate 210. That is, as illustrated in FIG. 7, the clutch weight 230 is in a state in which backward displacement in the rotary drive direction of the drive plate 210 is allowed. Thus, the clutch weight 230 relatively displaces in the opposite direction of the rotary drive direction of the drive plate 210 by the reactive force received through the clutch shoe 233. In this case, the swing support pin 214 and the pin slide hole 231 also slide on each other through the resin pivot-point-side slide member 215, and therefore, the clutch weight 230 can smoothly displace.

Accordingly, the weight-side cam body 235 formed at the clutch weight 230 is strongly pressed against the plate-side cam body 218. In this case, the plate-side cam body 218 is rotatably supported on the cam body support pins 217. Thus, the plate-side cam body 218 rotates counterclockwise as viewed in the figure by pressing by the weight-side cam body 235. Thus, in the clutch weight 230, the clutch shoe 233 is pushed to the clutch outer 240 side on the outside in the radial direction and is pressed against the cylindrical surface 241 as the weight-side cam body 235 climes on the plate-side cam body 218 while rotatably displacing the plate-side cam body 218. In this case, the plate-side cam body 218 is made of the resin material, and therefore, the plate-side cam body 218 can smoothly rotatably displace as compared to a case where both components are made of a metal material.

As a result, in the centrifugal clutch 200, after the clutch shoes 233 have contacted the cylindrical surface 241 of the clutch outer 240, the clutch shoes 233 are pressed against the cylindrical surface 241 in extremely-short time (in other words, instantaneously). Thus, the centrifugal clutch 200 is brought into a coupling state in which the rotary drive force of the engine is fully transmitted to the drive shaft 133. That is, the clutch weight 230 is brought into a state in which the clutch weight 230 enters a portion between the plate-side cam body 218 and the clutch outer 240 in a wedge manner. Moreover, in this case, the clutch weight 230 enters the portion between the plate-side cam body 218 and the clutch outer 240 in the wedge manner with the cam angle α in the initial state in which there is no or little abrasion of the clutch shoe 233.

Further, in this case, the pin slide hole 231 is formed with such a length that contact with the swing support pin 214 is avoided in a state in which the clutch weight 230 enters the portion between the plate-side cam body 218 and the clutch outer 240 in the wedge manner. That is, in the pin slide hole 231, a clearance S is ensured between the pin slide hole 231 and the pivot-point-side slide member 215 even in a state in which the clutch weight 230 enters the portion between the plate-side cam body 218 and the clutch outer 240 in the wedge manner. This prevents interference with entrance of the clutch weight 230 into the portion between the plate-side cam body 218 and the clutch outer 240.

In this coupling state, the centrifugal clutch 200 maintains a state in which the clutch shoes 233 are pressed against the cylindrical surface 241 of the clutch outer 240. Thus, the drive plate 210 and the clutch outer 240 are rotatably driven together. With this configuration, the rear wheel of the motorcycle is rotatably driven by the rotary drive force of the engine so that the motorcycle can run.

On the other hand, in a case where the number of rotations of the engine decreases, the centrifugal clutch 200 blocks transmission of the rotary drive force of the engine to the drive shaft 133. Specifically, in the centrifugal clutch 200, the centrifugal force acting on the clutch weight 230 becomes smaller than the elastic force (the pull force) of the coupling spring 232 as the number of rotations of the engine decreases. Thus, the clutch weight 230 turnably displaces inward in the radial direction about the swing support pin 214.

In this case, as illustrated in FIG. 8, the pin slide hole 231 is formed in the long hole shape along the circumferential direction of the drive plate 210, and the swing support pin 214 is positioned slightly on the front side with respect to the rear end portion of the pin slide hole 231 in the rotary drive direction of the drive plate 210. That is, the clutch weight 230 is in a state in which forward displacement in the rotary drive direction of the drive plate 210 is allowed. Thus, the clutch weight 230 rotatably displaces relative to the drive plate toward the front in the rotary drive direction of the drive plate 210 by the elastic force (the pull force) of the coupling spring 232. In this case, the clutch weight 230 displaces while the weight-side cam body 235 is rotatably displacing the plate-side cam body 218 clockwise as viewed in the figure.

Accordingly, the clutch weight 230 returns to an original position (a position upon idling as described above) (see FIG. 6). That is, the centrifugal clutch 200 is brought into a disconnection state in which the clutch shoes 233 do not contact the clutch outer 240 and no rotary drive force is transmitted. Moreover, the clutch weight 230 displaces to the side of one of two coupled coupling springs 232 that pulls from the position far from the swing support pin 214 (the coupling spring 232 hooked at the position adjacent to the weight-side cam body 235).

Thus, the swing support pin 214 is positioned at the rear end portion of the pin slide hole 231 in the rotary drive direction of the drive plate 210 (see FIG. 6). Even in a case where the number of rotations of the engine decreases as described above, the clutch weight 230 can smoothly turnably displace by the resin pivot-point-side slide member 215 and the resin plate-side cam body 218.

Figure 9:
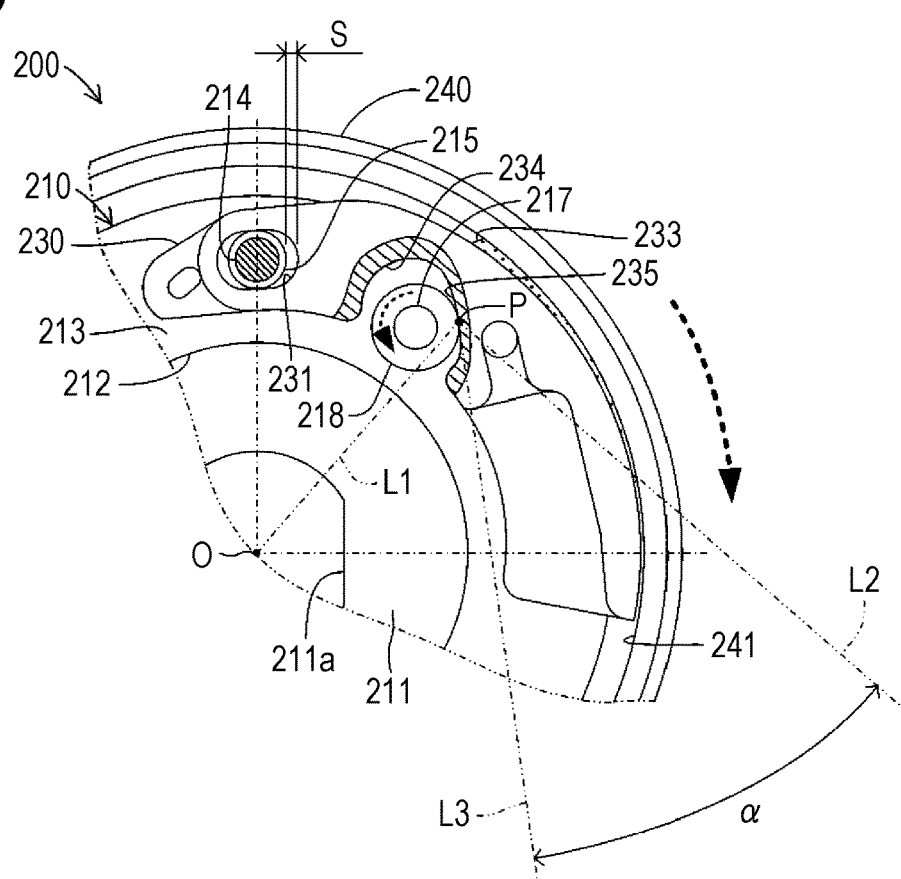
FIG. 9 is a partially-enlarged view illustrating a coupling state in which the clutch shoe contacts the clutch outer in a state in which the thickness of the clutch shoe is abraded to a terminal state close to a use limit in the centrifugal clutch illustrated in FIG. 6.

Next, a case where abrasion of the clutch shoe 233 has progressed and the clutch shoe 233 has become thinner and approached the terminal state close to the use limit will be described. In this terminal state of the clutch shoe 233, the centrifugal clutch 200 is also brought into the coupling state through a process similar to that described above. That is, as illustrated in FIG. 9, in the centrifugal clutch 200, the plate-side cam body 218 rotates relative to the cam body support pin 217 by an amount corresponding to an abrasion amount of the clutch shoe 233, and therefore, pressing force of the clutch shoe 233 on the cylindrical surface 241 of the clutch outer 240 is maintained.

In this case, the pin slide hole 231 is formed with such a length that even in a case where the clutch weight 230 enters the portion between the plate-side cam body 218 and the clutch outer 240 in the wedge manner by the amount corresponding to the abrasion amount of the clutch shoe 233, the clearance S for avoiding contact with the pivot-point-side slide member 215 is ensured. Thus, the pin slide hole 231 does not interfere with entrance of the clutch weight 230 into the portion between the plate-side cam body 218 and the clutch outer 240 even in a case where the clutch weight 230 enters the portion between the plate-side cam body 218 and the clutch outer 240 in the wedge manner by the amount corresponding to the abrasion amount of the clutch shoe 233.

Moreover, even in this terminal state, in the centrifugal clutch 200, the weight-side cam body 235 is formed as such a curved surface that the cam angle α is maintained before and after abrasion of the clutch shoe 233 progresses, and therefore, the cam angle α does not change. That is, the centrifugal clutch 200 can maintain the cam angle α constant and maintain assist thrust constant until the terminal state since the initial state of the clutch shoe 233. Thus, the centrifugal clutch 200 can prevent a driver driving the motorcycle from feeling a change in a drive operation feeling in the course of progress of abrasion of the clutch shoe 233.

As can be understood from operation description above, both of the sliding surfaces of the plate-side cam body 218 provided at the drive plate 210 and the weight-side cam body 235 provided at the clutch weight 230 include the curved surfaces in the centrifugal clutch 200 according to the above-described embodiment. Further, these sliding surfaces are formed as such curved surfaces that the cam angle α when the clutch shoe 233 contacts the cylindrical surface 241 of the clutch outer 240 is the same between before and after abrasion of the clutch shoe 233 progresses. Thus, in the centrifugal clutch 200 according to the present invention, even when the clutch shoe 233 is abraded, the assist thrust is maintained constant, and therefore, the drive operation feeling can be constant. Further, an increase in the assist thrust is suppressed, and therefore, abrasion and damage of a friction portion can be reduced while an increase in a surface pressure between the plate-side cam body 218 and the weight-side cam body 235 and a surface pressure between the clutch shoe 233 and the clutch outer 240 is suppressed.

Further, implementation of the present invention is not limited to the above-described embodiment, and various changes can be made without departing from the gist of the present invention. Note that in each of the following variations, the same reference numerals are used to represent components similar to those of the above-described embodiment, and description thereof will be omitted. Moreover, FIGS. 10, 12, and 13 of FIGS. 10 to 14 illustrating each variation do not show the E-ring 214b, the side plate 216, and the coupling spring 232, and illustrate, by a dashed arrow, each of the rotary drive directions of the drive plate 210 and the clutch outer 240 in the centrifugal clutch 200.

For example, in the above-described embodiment, in the centrifugal clutch 200, the sliding surface of the weight-side cam body 235 is formed in a curved shape such that the cam angle α when the clutch shoe 233 contacts the cylindrical surface 241 of the clutch outer 240 is the same between before and after abrasion of the clutch shoe 233 progresses. However, in the centrifugal clutch 200, the sliding surface of the weight-side cam body 235 can be formed in the curved shape such that the cam angle α when the clutch shoe 233 contacts the cylindrical surface 241 of the clutch outer 240 increases as abrasion of the clutch shoe 233 progresses.

Figure 10:
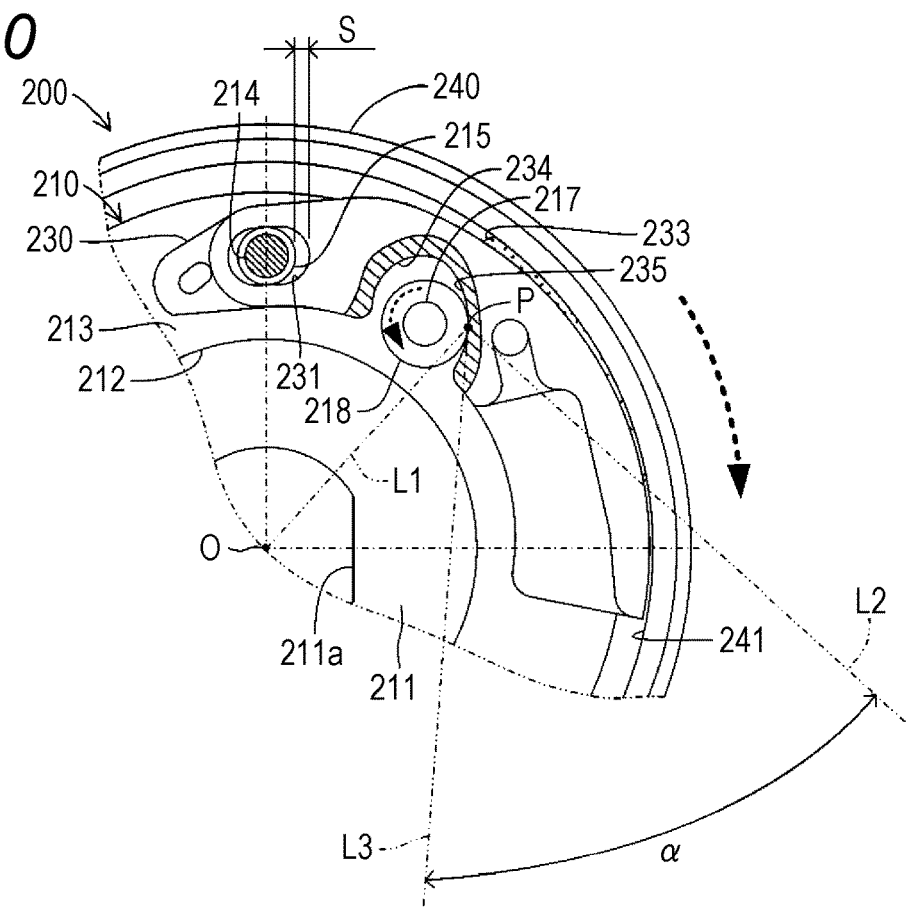
FIG. 10 is a partially-enlarged view illustrating a coupling state in which a clutch shoe contacts a clutch outer in a state in which the thickness of the clutch shoe is abraded to a terminal state close to a use limit in a centrifugal clutch according to a variation of the present invention.
Figure 11:
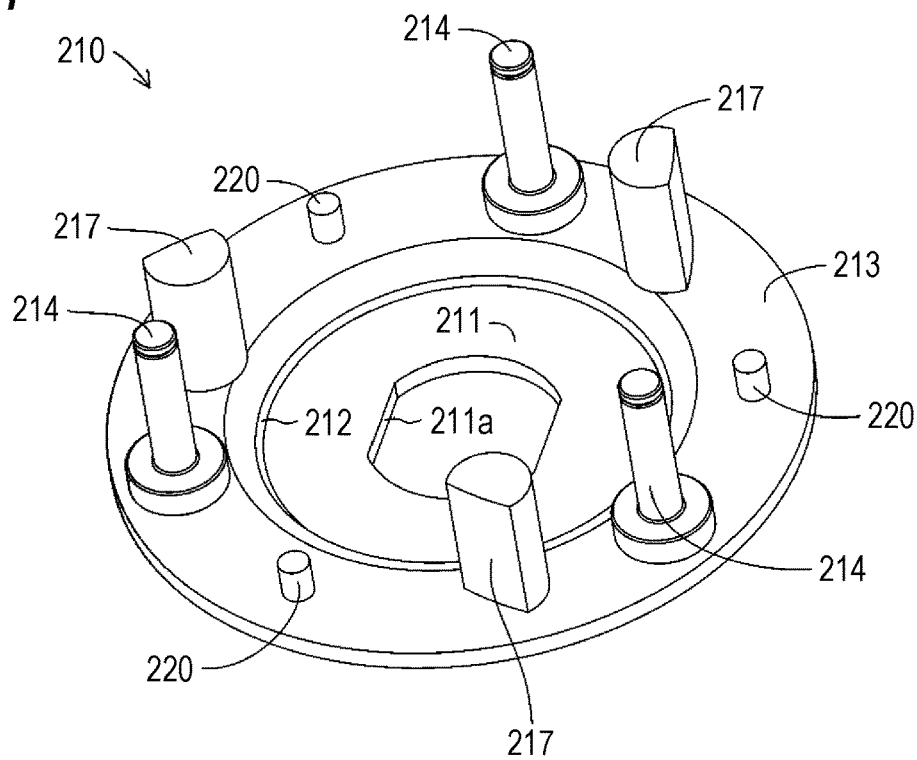
FIG. 11 is a perspective view schematically illustrating an external configuration of a drive plate in a centrifugal clutch according to another variation of the present invention.
Figure 12:
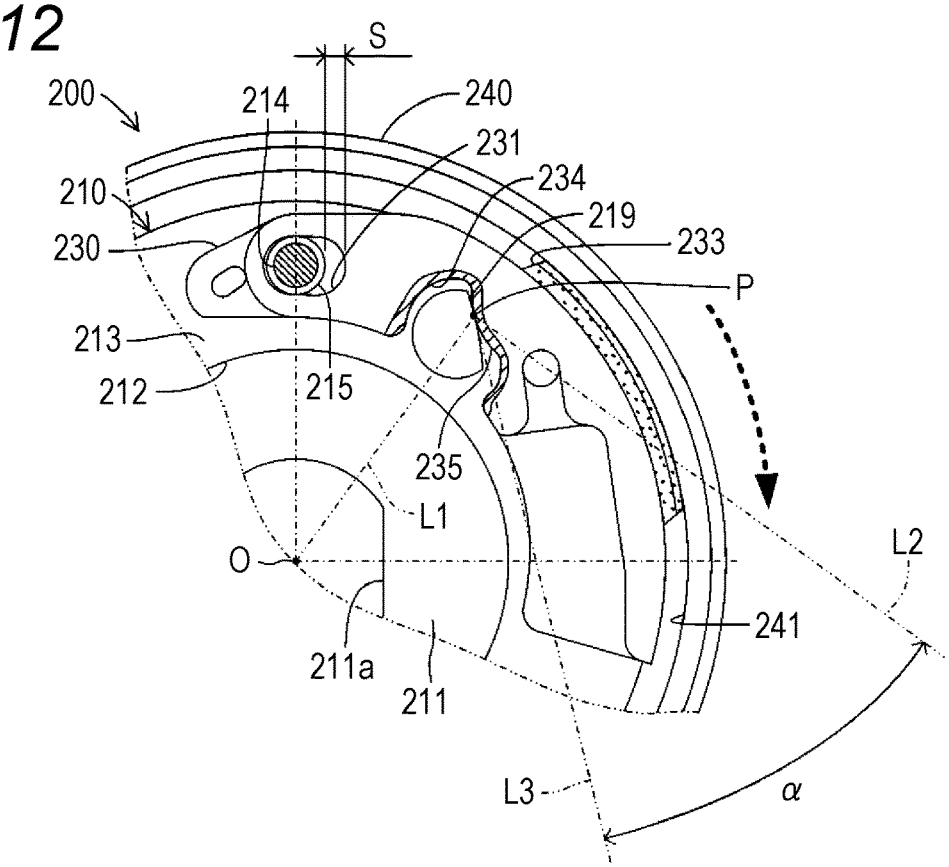
FIG. 12 is a partially-enlarged view illustrating a coupling state in which a clutch shoe contacts a clutch outer in an initial state in which there is no or little abrasion of the clutch shoe in the centrifugal clutch including the drive plate illustrated in FIG. 11.
Figure 13:
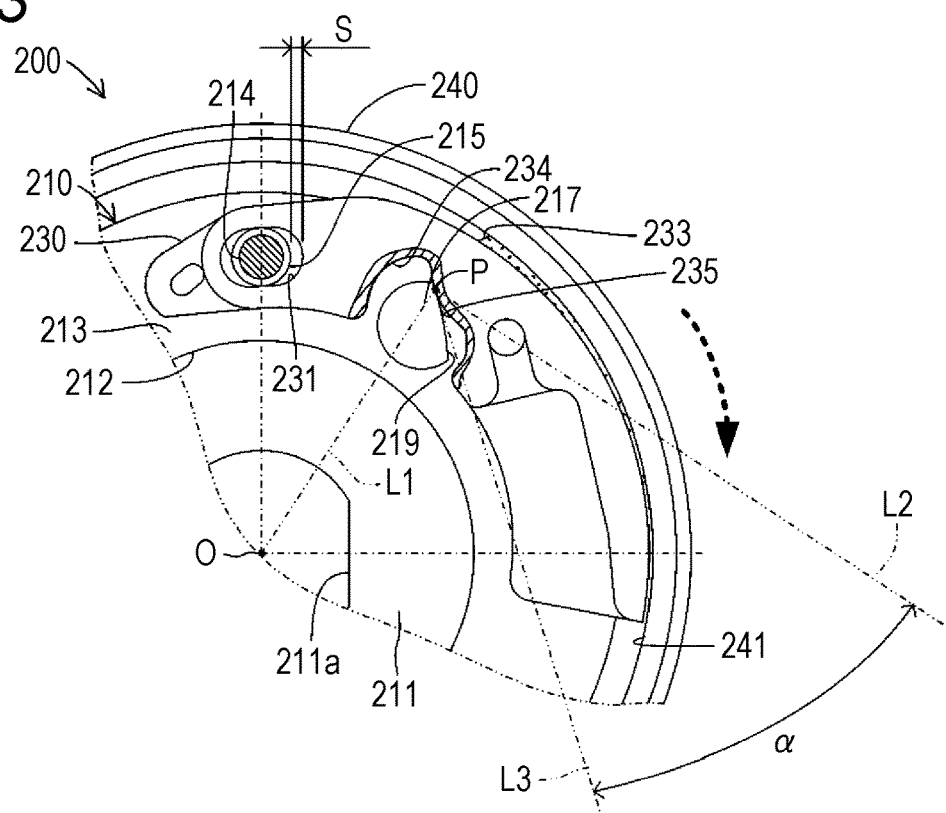
FIG. 13 is a partially-enlarged view illustrating a coupling state in which the clutch shoe contacts the clutch outer in a state in which the thickness of the clutch shoe is abraded to a terminal state close to a use limit in the centrifugal clutch including the drive plate illustrated in FIG. 11.

Specifically, as illustrated in FIG. 10, in the centrifugal clutch 200, the curved surface forming the sliding surface of the weight-side cam body 235 may be formed as a curved surface having a greater curvature than the curvature of the curved surface in the above-described embodiment. According to this configuration, the centrifugal clutch 200 reduces the assist thrust as abrasion of the clutch shoe 233 progresses, and therefore, acceleration of abrasion of friction members such as the clutch shoe 233 and the clutch outer 240 and damage of the clutch weight 230 of which clutch shoe 233 is lost due to abrasion and the cylindrical surface 241 of the clutch outer 240 due to contact between the clutch weight 230 and the cylindrical surface 241 can be reduced.

Moreover, in the above-described embodiment, in the centrifugal clutch 200, the plate-side cam body 218 provided at the drive plate 210 includes the rotatable roller, and the weight-side cam body 235 formed at the clutch weight 230 includes the curved surface. That is, in the centrifugal clutch 200, each of the plate-side cam body 218 and the weight-side cam body 235 sliding on each other and forming a pair of cams includes the curved surface. However, in the centrifugal clutch 200, at least one of the plate-side cam body 218 and the weight-side cam body 235 sliding on each other and forming the pair of cams may include the curved surface.

Thus, in the centrifugal clutch 200, the weight-side cam body 235 can be, as in the prior art, formed in a linear planar shape, and the curved surface forming the plate-side cam body 218 can be formed in such a shape that the cam angle α when the clutch shoe 233 contacts the cylindrical surface 241 of the clutch outer 240 is the same between before and after abrasion of the clutch shoe 233 progresses or increases as abrasion of the clutch shoe 233 progresses. Moreover, in the centrifugal clutch 200, the plate-side cam body 218 can be formed in a linear planar shape, and the curved surface forming the weight-side cam body 235 can be formed in such a shape that the cam angle α when the clutch shoe 233 contacts the cylindrical surface 241 of the clutch outer 240 is the same between before and after abrasion of the clutch shoe 233 progresses or increases as abrasion of the clutch shoe 233 progresses.

Further, in the above-described embodiment, the plate-side cam body 218 includes the roller rotatable on the drive plate 210. However, it may be enough that the plate-side cam body 218 has a surface formed to protrude outward of an outer peripheral portion of the drive plate 210, having a shape pushing out the clutch weight 230 through the weight-side cam body 235, and extending in a rotary drive axis direction of the drive plate 210, i.e., a surface standing on a plate surface of the drive plate 210.

That is, at least one of the plate-side cam body 218 or the weight-side cam body 235 may be formed to extend outward of the drive plate 210 toward the rear side in the rotary drive direction of the drive plate 210. Of the plate-side cam body 218 and the weight-side cam body 235, portions extending toward the rear side in the rotary drive direction of the drive plate 210 and extending outward of the drive plate 210 may be, in this case, formed across the entirety or part of the plate-side cam body 218 and the weight-side cam body 235.

Thus, in the centrifugal clutch 200, the plate-side cam body 218 can be, for example, formed in a non-rotatable non-slidable fixed state on the drive plate 210. Moreover, as illustrated in, e.g., each of FIGS. 11 to 13, the centrifugal clutch 200 can be configured such that plate-side cam bodies 219 are, instead of the cam body support pins 217, provided on the flange portion 213 of the drive plate 210. The plate-side cam body 219 includes a rod-shaped body standing in the vertical direction, and part of an outer surface of the rod-shaped body has a sliding surface including a curved surface. In this case, the plate-side cam body 218 can include a curved surface in a recessed shape other than the curved surface projecting in a shape raised toward the weight-side cam body 235.

The plate-side cam body 218 can be made of a material other than the resin material, such as a metal material (e.g., carbon steel, an iron-based sintered material, or an aluminum material). In this case, the plate-side cam body 218 can be made of the same material as that of the cam body support pin 217 or the weight-side cam body 235, or can be made of a material different from that of the cam body support pin 217 or the weight-side cam body 235. Alternatively, the plate-side cam body 218 is made of a more-easily-abradable material than the material(s) forming the cam body support pin 217 and/or the weight-side cam body 235, and therefore, abrasion of the cam body support pin 217 and/or the weight-side cam body 235 can be reduced. Alternatively, the plate-side cam body 218 is made of a material (e.g., an aluminum material) having better slidability than that of the material(s) forming the cam body support pin 217 and/or the weight-side cam body 235, and therefore, the slidability between the cam body support pin 217 and the weight-side cam body 235 can be improved. Alternatively, the plate-side cam body 218 can be also made of a material (e.g., a metal material or a ceramic material) having thermal resistance and abrasion resistance.

Moreover, in the above-described embodiment, each of the plate-side cam body 218 and the weight-side cam body 235 includes the curved surface having a single curvature. However, each of the plate-side cam body 218 and the weight-side cam body 235 can have a curved surface with two or more curvatures. According to this configuration, the centrifugal clutch 200 can change the assist thrust according to the abrasion amount of the clutch shoe 233.

Further, in the above-described embodiment, the single plate-side cam body 218 and the single weight-side cam body 235 are each provided at the drive plate 210 and each clutch weight 230. However, two or more plate-side cam bodies 218 and two or more weight-side cam bodies 235, i.e., two pairs or more of plate-side cam body 218 and weight-side cam body 235, can be provided at the drive plate 210 and each clutch weight 230.

In addition, in the above-described embodiment, the weight-side cam body 235 is formed and configured as the curved surface recessed from the plate-side cam body 218. However, it may be enough that the weight-side cam body 235 is formed in such a shape that the weight-side cam body 235 slides on the plate-side cam body 218 to climb on the plate-side cam body 218. Thus, the weight-side cam body 235 can be, as illustrated in, e.g., FIG. 12 or 13, also formed and configured as a curved surface projecting in a raised shape toward the plate-side cam body 218.

Figure 14:
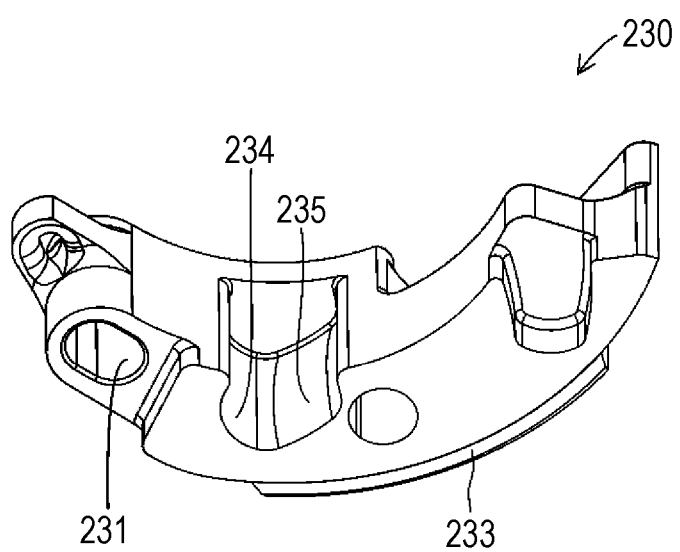
FIG. 14 is a perspective view schematically illustrating, as seen from a drive plate side, an external configuration of a clutch weight in a centrifugal clutch according to still another variation of the present invention.

Moreover, in the above-described embodiment, the sliding surfaces of the plate-side cam body 218 and the weight-side cam body 235 sliding on each other include the curved surfaces in the raised shape along a sliding direction. With this configuration, the plate-side cam body 218 and the weight-side cam body 235 slide in line contact with each other. However, at least one of the plate-side cam body 218 or the weight-side cam body 235 can include a surface also curved in a direction perpendicular to the sliding direction. For example, a curved surface illustrated in FIG. 14 is configured to curve in a raised shape in each of the sliding direction and the direction (the thickness direction of the clutch weight 230 as viewed in the figure) perpendicular to the sliding direction with respect to the plate-side cam body 218. According to this configuration, in the centrifugal clutch 200, friction resistance of the plate-side cam body 218 and the weight-side cam body 235 can be reduced. Thus, transition between a drive force transmission state and a drive force blocking state can be smoothly performed.

Further, in the above-described embodiment, the centrifugal clutch 200 is configured such that the swing support pins 214 are provided at the drive plate 210 and the pin slide holes 231 are provided at the clutch weights 230. However, one of the swing support pin 214 or the pin slide hole 231 may be provided at the drive plate 210 or the clutch weight 230, and the other one of the swing support pin 214 or the pin slide hole 231 may be provided at the clutch weight 230 or the drive plate 210. Thus, the centrifugal clutch 200 can be also configured such that the swing support pins 214 are provided at the clutch weights 230 and the pin slide holes 231 are provided at the drive plate 210.

Moreover, in the above-described embodiment, the pin slide hole 231 is formed as the arc-shaped through-hole. However, it is enough to form the pin slide hole 231 as the long hole allowing backward displacement of the clutch weight 230 in the rotary drive direction of the drive plate 210 in a state (see FIG. 6) in which the clutch shoe 233 of the clutch weight 230 is most separated from the cylindrical surface 241 of the clutch outer 240. Thus, the pin slide hole 231 is not limited to that of the above-described embodiment.

Thus, the pin slide hole 231 can be formed in a linear shape extending in a tangential direction perpendicular to the radial direction of the drive plate 210. Alternatively, the pin slide hole 231 can be also formed as a so-called blind hole opening on one side and closed on the other side.

Moreover, in the above-described embodiment, the pivot-point-side slide member 215 is formed in the cylindrical shape from the resin material, and is rotatably slidably provided at the outer peripheral portion of the swing support pin 214. In other words, the pivot-point-side slide member 215 is configured to function as a roller for the swing support pin 214. However, it is enough to provide the pivot-pointside slide member 215 between the swing support pin 214 and the pin slide hole 231 to slidably displace these components.

Thus, the pivot-point-side slide member 215 can be made of other materials than the resin material, such as a metal material. In this case, the pivot-point-side slide member 215 may be made of the same material as that of the swing support pin 214 or the pin slide hole 231, or may be made of a material different from that of the swing support pin 214 or the pin slide hole 231. In this case, the pivot-point-side slide member 215 is made of a more-easily-abradable material than the material(s) forming the swing support pin 214 and/or the pin slide hole 231, and therefore, abrasion of the swing support pin 214 and/or the pin slide hole 231 can be reduced. Alternatively, the pivot-point-side slide member 215 is made of a material (e.g., an aluminum material) having better slidability than that of the material(s) forming the swing support pin 214 and/or the pin slide hole 231, and therefore, the slidability between the swing support pin 214 and the pin slide hole 231 can be improved. Alternatively, the pivot-point-side slide member 215 can be also made of a material (e.g., a metal material or a ceramic material) having thermal resistance and abrasion resistance.

Further, the pivot-point-side slide member 215 can be provided in a non-rotatable non-slidable fixed state at the outer peripheral portion of the swing support pin 214. In this case, the pivot-point-side slide member 215 may be formed in a tubular shape fitted onto the swing support pin 214. Alternatively, a cutout portion can be formed at the swing support pin 214, and the pivot-point-side slide member 215 can be formed in a plate shape fitted in such a cutout portion and extending in a planar shape or an arc shape. In addition, the pivot-point-side slide member 215 can be also formed by resin material insert molding for the cutout portion formed at the swing support pin 214. Moreover, one of the swing support pin 214 itself or the pin slide hole 231 itself can be also made of a resin material. Note that the pivot-point-side slide member 215 is rotatably slidably formed at the outer peripheral portion of the swing support pin 214 so that the pivot-point-side slide member 215 can be easily assembled with the swing support pin 214 and slide resistance can be reduced.

Moreover, the pivot-point-side slide member 215 can be also provided at the pin slide hole 231 in addition to or instead of the swing support pin 214. Further, the centrifugal clutch 200 can be also configured such that the pivot-point-side slide member 215 is omitted and the swing support pin 214 and the pin slide hole 231 are directly fitted to each other upon sliding.

LIST OF REFERENCE SIGNS

P Contact point between plate-side cam body and weight-side cam body
O Rotary drive center of drive plate
S Clearance
α Cam angle
L1 Line passing through contact point between plate-side cam body and weight-side cam body and rotary drive center of drive plate
L2 Normal line to L1
L3 Tangential line at contact point between plate-side cam body and weight-side cam body
100 Power transmission mechanism
101 Transmission
110 Drive pulley
111 Crankshaft
112 Stationary drive plate
112a Radiation fin
113 Movable drive plate
114 Sleeve bearing
115 Roller weight
116 Lamp plate
120 V-belt
130 Driven pulley
131 Stationary driven plate
132 Driven sleeve
133 Drive shaft
134 Movable driven plate
135 Torque spring
200 Centrifugal clutch
210 Drive plate
211 Bottom portion
211a Through-hole
212 Tube portion
213 Flange portion
214 Swing support pin
214a Attachment bolt
214b E-ring
215 Pivot-point-side slide member
216 Side plate
217 Cam body support pin
217a Attachment bolt
218, 219 Plate-side cam body
220 Damper receiving pin
221 Damper
230 Clutch weight
231 Pin slide hole
232 Coupling spring
233 Clutch shoe
234 Plate-side cam body relief
235 Weight-side cam body
240 Clutch outer
241 Cylindrical surface

The invention claimed is:
1. A centrifugal clutch comprising:
a drive plate to be rotatably driven together with a driven pulley in response to drive force of an engine;
a clutch outer having, outside the drive plate, a cylindrical surface provided concentrically with the drive plate;
a clutch weight having a clutch shoe formed to extend along a circumferential direction of the drive plate and facing the cylindrical surface of the clutch outer, one end side of the clutch weight in the circumferential direction being turnably attached onto the drive plate through a swing support pin and a pin slide hole and the other end side displacing toward a cylindrical surface side of the clutch outer;
a plate-side cam body having, on the drive plate, a surface extending in a rotary drive axis direction of the drive plate; and
a weight-side cam body provided at the clutch weight and configured to slide and climb on the plate-side cam body upon displacement of the other end side of the clutch weight,
wherein the swing support pin is provided at one of the drive plate or the clutch weight, and is formed to extend toward the other one of the drive plate or the clutch weight,
the pin slide hole is provided at the other one of the drive plate or the clutch weight and is formed in a long hole shape allowing backward displacement of the one end side of the clutch weight in the rotary drive direction of the drive plate, and the swing support pin is slidably displaceably fitted in the pin slide hole, and at the plate-side cam body and the weight-side cam body, at least one of sliding surfaces has a curved surface, and the at least one of the sliding surfaces is, assuming a cam angle as an angle between a normal line to a line passing through a sliding portion at which the plate-side cam body and the weight-side cam body contact each other and a rotary drive center of the drive plate and a tangential line to the curved surface at the sliding portion, formed as such a curved surface that the cam angle when the clutch shoe contacts the cylindrical surface of the clutch outer is identical between before and after abrasion of the clutch shoe progresses or the cam angle after the abrasion has progressed is greater.

2. The centrifugal clutch according to claim 1, wherein at the plate-side cam body and the weight-side cam body, the at least one of the sliding surfaces is formed as such a curved surface that the cam angle when the clutch shoe contacts the cylindrical surface of the clutch outer is identical between before and after the abrasion of the clutch shoe progresses.

3. The centrifugal clutch according to claim 2, wherein the plate-side cam body is configured such that the sliding surface has a raised curved surface, and the weight-side cam body is configured such that the sliding surface has a recessed or raised curved surface sliding on the raised curved surface.

4. The centrifugal clutch according to claim 3, wherein the plate-side cam body includes a roller supported rotatably on the drive plate, and the weight-side cam body is configured such that the sliding surface has a curved surface sliding on the roller.

5. The centrifugal clutch according to claim 4, further comprising:

a pivot-point-side slide member provided between the swing support pin and the pin slide hole to slide the swing support pin and the pin slide hole.

6. The centrifugal clutch according to claim 2, further comprising:

a pivot-point-side slide member provided between the swing support pin and the pin slide hole to slide the swing support pin and the pin slide hole.

7. The centrifugal clutch according to claim 3, further comprising:

a pivot-point-side slide member provided between the swing support pin and the pin slide hole to slide the swing support pin and the pin slide hole.

8. The centrifugal clutch according to claim 1, wherein the plate-side cam body is configured such that the sliding surface has a raised curved surface, and the weight-side cam body is configured such that the sliding surface has a recessed or raised curved surface sliding on the raised curved surface.

9. The centrifugal clutch according to claim 8, wherein the plate-side cam body includes a roller supported rotatably on the drive plate, and the weight-side cam body is configured such that the sliding surface has a curved surface sliding on the roller.

10. The centrifugal clutch according to claim 9, further comprising:

a pivot-point-side slide member provided between the swing support pin and the pin slide hole to slide the swing support pin and the pin slide hole.

11. The centrifugal clutch according to claim 8, further comprising:

a pivot-point-side slide member provided between the swing support pin and the pin slide hole to slide the swing support pin and the pin slide hole.

12. The centrifugal clutch according to claim 1, further comprising:

a pivot-point-side slide member provided between the swing support pin and the pin slide hole to slide the swing support pin and the pin slide hole.

* * * * *